(12) United States Patent
Stodola et al.

(10) Patent No.: US 8,452,177 B2
(45) Date of Patent: May 28, 2013

(54) METHOD AND APPARATUS FOR FAST OPTICAL SIGNAL IMPAIRMENT EVALUATION

(75) Inventors: Kevin C. Stodola, Naperville, IL (US); Steven D. Schwager, Lisle, IL (US)

(73) Assignee: Tellabs Operations, Inc., Naperville, IL (US)

( * ) Notice: Subject to any disclaimer, the term of this patent is extended or adjusted under 35 U.S.C. 154(b) by 459 days.

(21) Appl. No.: 12/715,571

(22) Filed: Mar. 2, 2010

(65) Prior Publication Data
US 2011/0188852 A1 Aug. 4, 2011

Related U.S. Application Data

(60) Provisional application No. 61/300,666, filed on Feb. 2, 2010.

(51) Int. Cl.
*H04B 10/18* (2006.01)
*H04B 10/20* (2006.01)

(52) U.S. Cl.
USPC .................. 398/66; 398/26; 398/28; 398/81

(58) Field of Classification Search
USPC .................................. 398/25–28, 66–67, 81
See application file for complete search history.

(56) References Cited

U.S. PATENT DOCUMENTS

2010/0054267 A1* 3/2010 Bernstein et al. ............. 370/410
2011/0103790 A1* 5/2011 Palacharla et al. ................ 398/1

* cited by examiner

*Primary Examiner* — Leslie Pascal
(74) *Attorney, Agent, or Firm* — Hamilton, Brook, Smith & Reynolds, P.C.

(57) ABSTRACT

Having a fast method to perform impairment evaluation is useful for many networks. A method or corresponding apparatus according to an example embodiment of the present invention maintains a traffic engineering database of values representing characteristics of links in the network through storage of integer values representing advertised optical signal capabilities of links between the multiple optical nodes. The example embodiment determines a path through the network for optical wavelengths to be supported by the links represented in the database as a function of evaluating optical signal characteristics at each link along a possible path using the advertised optical signal capabilities and provides a selected path meeting an acceptable integrity of the optical wavelengths to a path establishment module to establish the path through the optical network. Example embodiments significantly reduce computational complexity associated with impairment evaluation and path selection in an optical network.

30 Claims, 6 Drawing Sheets

| OCh Signal Type | OCh Rate (bps) | Nominal OSNR Spec with EFEC |
|---|---|---|
| OCh_10 | 10,709,225,317 | 16.0 dB |
| OCh_10a | 11,049,107,143 | 16.0 dB |
| OCh_10b | 11,095,727,048 | 16.0 dB |
| OCh_10c | 11,270,090,000 | 17.5 dB |
| OCh_40 DQPSK | 43G | 16.5 dB |

METHOD AND APPARATUS FOR FAST OPTICAL SIGNAL IMPAIRMENT EVALUATION

RELATED APPLICATION

This application claims the benefit of U.S. Provisional Application No. 61/300,666, filed on Feb. 2, 2010. The entire teachings of the above application are incorporated herein by reference.

BACKGROUND

Communications networks transmit network traffic from a source node to a destination node through a network of intermediate nodes. When a communication request is placed, the network establishes a path from the source, through the network nodes, to the destination node. Generally, there are two requirements for the selected path: efficiency and resilience. In order to achieve these requirements, a network may pre-calculate the characteristics of the links between the nodes in the network and select a path that includes the more or most efficient links (e.g., links having desired characteristics including lower latencies, high throughput, low incidence of data loss, low jitter, etc.).

SUMMARY

A method or corresponding apparatus in an example embodiment of the present invention relates to routing of optical wavelengths in an optical network having multiple optical network nodes. The example embodiment maintains a traffic engineering database of values representing characteristics of links in the network, through storage of integer values representing advertised optical signal capabilities of links between the multiple optical nodes. The example embodiment determines a path through the network for optical wavelengths to be supported by the links represented in the database as a function of evaluating optical signal characteristics at each link along a possible path using the advertised optical signal capabilities. The example embodiment provides a selected path meeting an acceptable integrity of the optical wavelengths to a path establishment module to establish the path through the optical network.

Another method or corresponding apparatus in an example embodiment of the present invention relates to routing optical wavelengths in an optical network having multiple optical network nodes. The example embodiment determines integer values representing optical signal capabilities of links in the network, where the integer values represents link-specific signal impairments. The example embodiment advertises the integer value optical signal capabilities of each link along each possible path in the network and determines a path through the network for optical wavelengths to be supported by the links as a function of advertised integer value optical signal capabilities.

Yet another method or corresponding apparatus in an example embodiment of the present invention relates to planning deployment of optical network links. The example embodiment advertises integer value optical signal capabilities of each link along each possible path in an optical network, where the integer values represent link-specific signal impairment. The example embodiment determines a path through the network for optical wavelengths to be supported by the optical network links as a function of advertised integer value optical signal capabilities, such that the determined path meets an acceptable integrity of the optical wavelengths.

The example embodiment provides the determined path to a network planning tool to employ the path to plan the optical network.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

In calculating a route through a network of nodes and links, a standard constrained shortest path first (CSPF) method builds a network graph, accumulating a set of path data. Therefore, as each vertex of the network graph is added, a series of constraints for that vertex of the graph is evaluated. For optical routes, the accumulated data includes signal impairment information, aggregated from the impairments allocated to each link, along the paths being considered during routing. As each vertex is evaluated, the aggregated impairment information is evaluated to determine if a path is acceptable (i.e., meets acceptable integrity of optical wavelengths). Given the volume of the calculations involved in determining the aggregated impairment information, a fast method for performing the impairment evaluation and accumulation would be useful.

Figure 1:
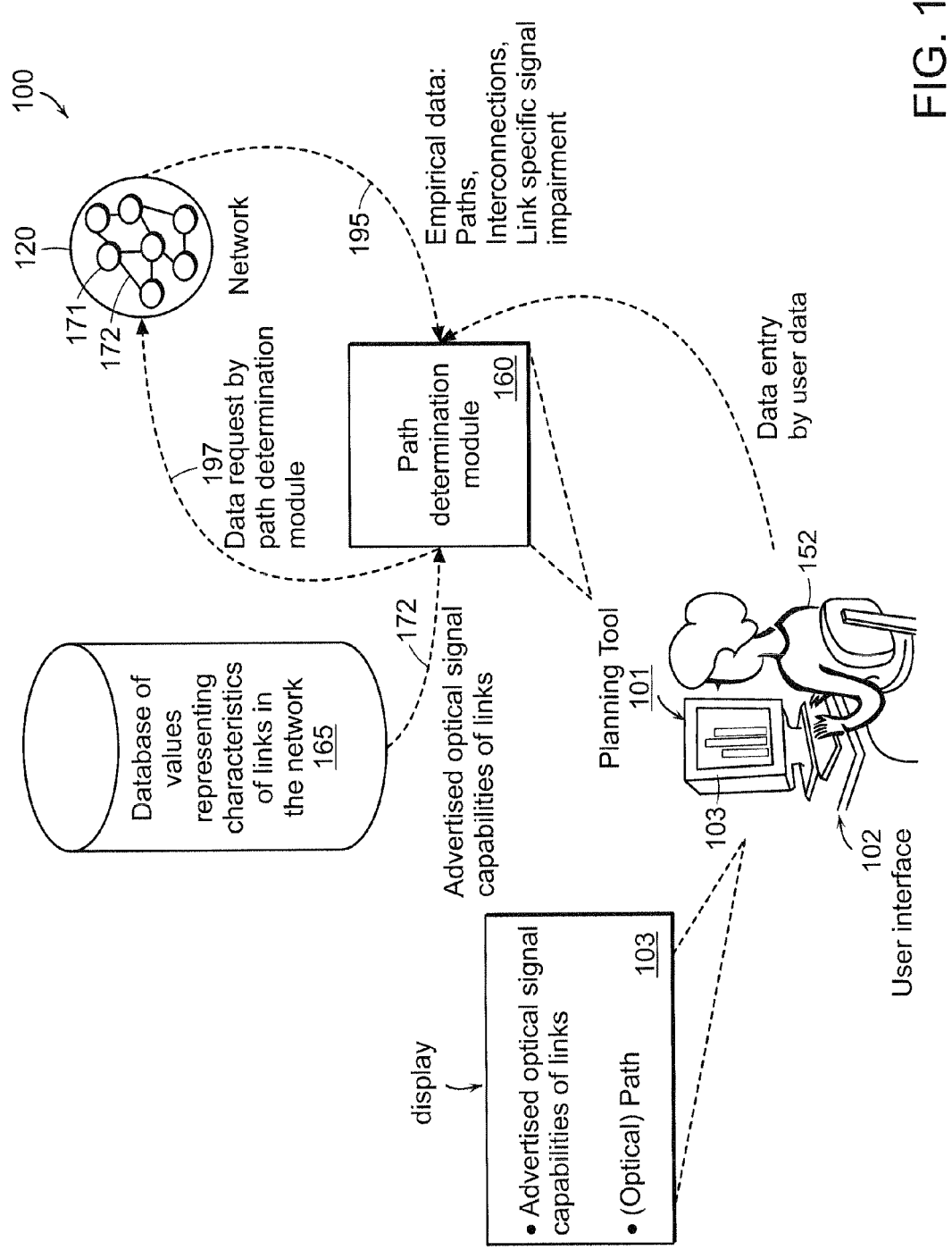
FIG. 1 is a schematic diagram that illustrates a user using an example embodiment of the present invention for planning a network.

FIG. 1 is a schematic diagram that illustrates an example embodiment 100 of the present invention for a planning tool 101 used for determining a path in a network 120. The network 120 may be organized in various arrangements, such as a ring, linear, or mesh topology.

The planning tool 101 includes a path determination module 160 that calculates a path through the network 120 for optical wavelengths to be supported by network links included in a database 165 of values representing characteristics of links 170 in the network spanning between nodes 171. The database 165 may be a traffic engineering database of values that relate to characteristics of links in the network. The database stores optical signal characteristics 172 of links 170 between the multiple optical nodes. A path determination module 160 may calculate the path by evaluating optical signal characteristics at each link along a possible path using the optical signal characteristics 170.

The path determination module 160 may further request data 197 used in determining a path and obtain empirical data 195, including paths, interconnections, and link-specific signal impairments from the network. The path determination module 160 may also receive data entered by a user 152, including information regarding link-specific signal impairments.

The planning tool 101 may include a display module 103 that displays a selected path or advertised optical signal capabilities of links 170. This allows the user 152 to add additional information or plan the network (or modify an existing network) while ensuring that an acceptable integrity of the optical wavelengths is met.

The planning tool 101 may also employ a user interface 102, such as a keyboard or a computer mouse (not shown), for enabling the user 152 to interact with the planning tool 101.

Figure 2:
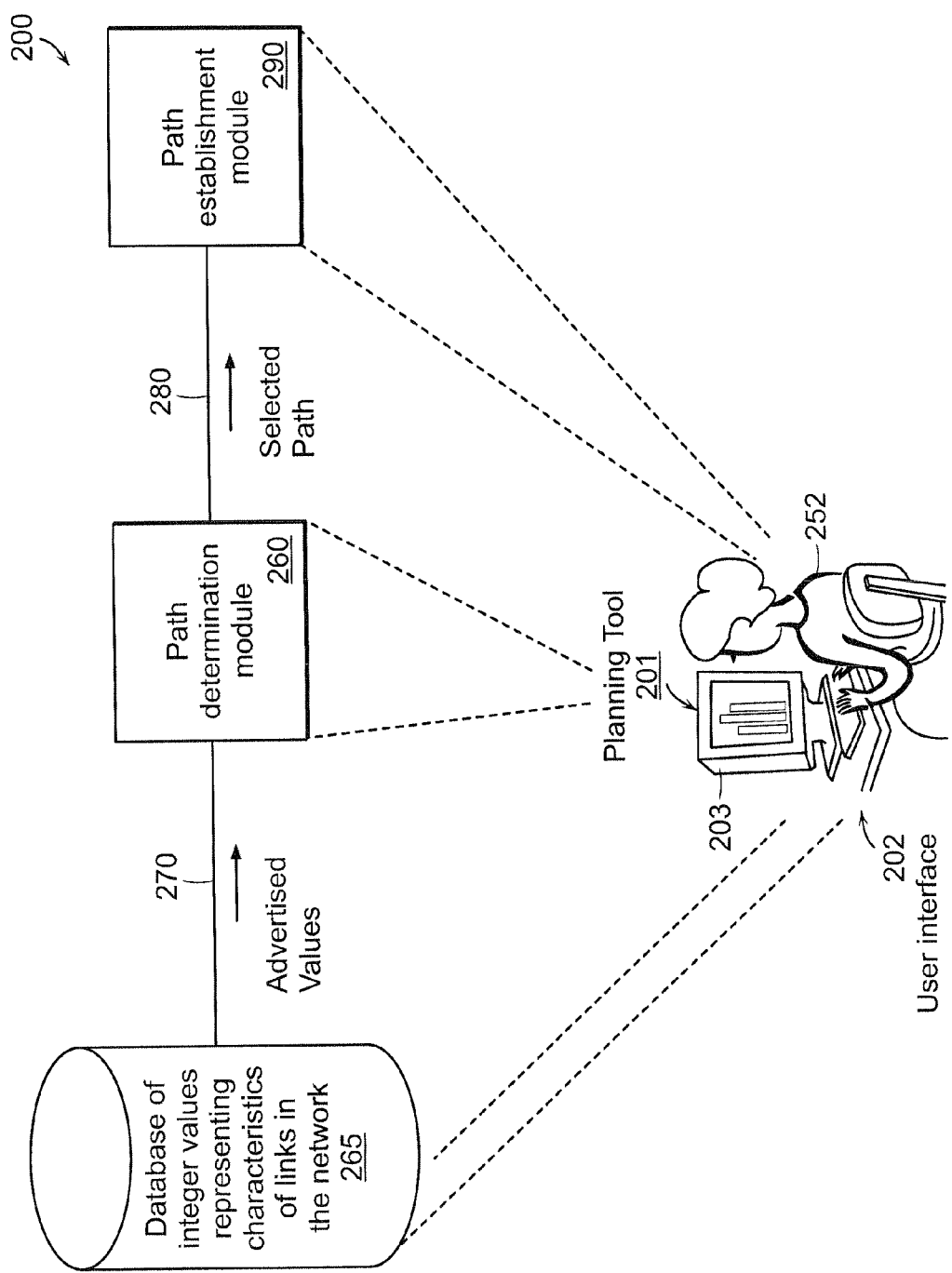
FIG. 2 illustrates an example of network management functions implemented in a network in relation to a path determination module in accordance with an example embodiment of the present invention.

FIG. 2 illustrates an example 200 of network management functions implemented in a network, such as the network 120 of FIG. 1, in relation to a path determination module 260 according to an example embodiment of the present invention. The database of integer values represents characteristics of links in the network. Specifically, the database may be a traffic engineering database or other form of database supporting embodiments disclosed herein that includes integer values, such as 32-bit or 64-bit scaled integer values, representing link specific signal impairments, such as optical signal-to-noise ratio, chromatic dispersion, or polarization mode dispersion impairments. The advertised values 270 are passed to the path determination module 260 from the database 265. The path determination module 260 evaluates the optical signal characteristics at each link along a possible path using the advertised optical signal capabilities and employs the evaluated signal characteristics to determine a selected path 280 through the network for optical wavelengths to be supported by the links represented in the database. The path determination module 260 may ensure that the path meets an acceptable integrity of the optical wavelengths or ensure that some other or additional characteristics meet a traffic engineering requirement or other specified requirements. The selected path 280 is provided to a path establishment module 290 to establish a path through the optical network.

The path establishment module 290 may be used in a network planning tool 201 that plans deployment of optical network links. In certain embodiments, the path establishment module 290 may be a network management system (not shown) or a network signaling system (not shown), including module distributed among the nodes of the network.

The planning tool 201 may include a display module 203 that displays a selected path or advertised optical signal capabilities of links 270. This allows the user 252 to add additional information or plan the network (or modify an existing network) while ensuring that an acceptable integrity (or other characteristic(s)) of the optical wavelengths is met. The planning tool 201 may also employ a user interface 202 for enabling the user 251 to interact with the planning tool 201. The path establishment module 290 may be a signaling system that is responsible for establishing the path. In certain embodiments, a network element (not shown) may notify a network management system (located in the planning tool, not shown) that a path has been established. In certain embodiments, the path establishment module 290 may establish a path upon receiving a request from an upstream network element (possibly a network element of another network).

In the view of the foregoing, the following description illustrates example embodiments and features that may be incorporated into a system for routing of optical wavelengths in an optical network having multiple optical network nodes, where the term "system" may be interpreted as a system, subsystem, device, apparatus, method, or any combination thereof.

The optical signal capabilities may include link-specific signal impairments, such as at least one of optical signal-to-noise ratio, chromatic dispersion, or polarization mode dispersion impairments.

The traffic engineering database may include integer values representing chromatic dispersion impairments of the links between the multiple optical nodes. The integer values may be obtained using an agent or a control plane code. The traffic engineering database may include integer values representing inverse values of optical signal-to-noise ratio impairments of the links between the multiple optical nodes. The traffic engineering database may include integer values representing squared values of polarization mode dispersion impairments of the links between the multiple optical nodes.

The system may aggregate the advertised optical signal capabilities to determine the acceptable integrity of the optical wavelengths for a selected path. In order to determine the acceptable integrity or other parameter of the optical wavelengths for a candidate path, the system may obtain an aggregate value of the scaled integer values representing the inverse values of optical signal-to-noise ratio impairments, deduct one or more offset penalty values from the aggregate value, compare the resulting value against a threshold value, and, in an event the resulting value exceeds the threshold value, determine the unacceptable integrity of the optical wavelengths for the candidate path based on the resulting value. The threshold value may be determined as a function of optical signal bit rate and other factors.

The offset penalty values may include penalty values for polarization mode dispersion, chromatic dispersion and other possible impairment factors. The offset penalty values may be optical signal rate dependent.

Figures 3A, 3B:
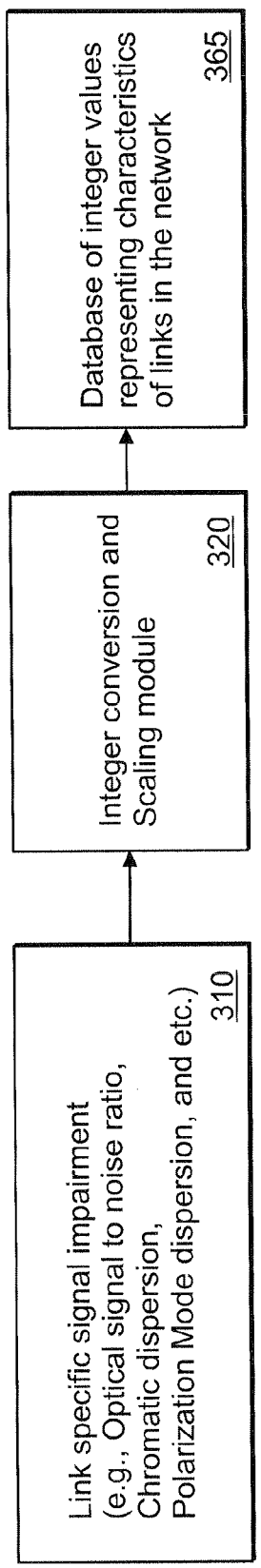
FIG. 3A is a diagram that illustrates an example of procedures involved in obtaining a database of values representing characteristics of links in a network.
FIG. 3B is a table that maps values of optical channel signals to nominal optical signal-to-noise ratio requirements.

FIG. 3A is a diagram that illustrates an example 300 of procedures involved in obtaining a database of values representing the characteristics of links 365 in a network. In order to support the routing of optical channel signals (OCh), the example embodiment 300 updates the traffic engineering (TE) Link Opaque Link-State Advertisement (LSA) used to advertise optical channel signals layer link capabilities to participating traffic engineering routers. The example embodiment 300 handles the optical channel signal impairments using additional metrics attributes in the LSA to accommodate the link specific signal impairments 310, such as Chromatic Dispersion (CD) impairments, Polarization Mode Dispersion (PMD) impairments, and Optical Signal-to-Noise Ratio (OSNR).

Chromatic dispersion is a property of glass medium in fiber spans. Since higher frequency wavelengths travel through glass at a slightly different speed than slower frequency wavelengths, smearing of transmitted signals through the glass medium may occur. Dispersion compensation modules may be employed to compensate for chromatic dispersion in fiber spans so that chromatic dispersion tends not to be a limiting factor. However, since the dispersion compensation modules are provided in fixed length increments, they may not fully compensate for chromatic dispersion or result in undercompensation or overcompensation for some spans. The amount of chromatic dispersion tends to be small such that other impairment factors limit the path well before chromatic dispersion becomes a limiting factor. Therefore, when operating in optical networks, systems with chromatic dispersion compensation generally do not need to provide for chromatic dispersion impairments on links or for aggregation and limit testing during routing.

For networks that require compensation for chromatic dispersion, the example embodiment 300 treats the chromatic dispersion aggregation as an additive aggregation. As such, another additional metric attribute may be employed to accommodate for link specific chromatic dispersion signal impairments 310.

The example embodiment 300 employs an integer conversion and scaling module 320 to scale the chromatic dispersion values configured for links in the network (or as a limiting value) to corresponding 32-bit, scaled, signed, integer values (or other form of integer values). Upon conversion and scaling, the chromatic dispersion values for the links are advertised by routing protocols (e.g., Open Shortest Path First) in terms of the scaled 32-bit integer value.

The integer conversion and scaling module 320 may scale the chromatic dispersion values configured for links in the network by agent or control plane code. In certain embodiments, a user may be able to enter chromatic dispersion values into a link configuration value and limit value configurations in their native form (i.e., floating point) form without having to perform scaling and conversion.

Polarization mode dispersion occurs due to splitting of energy of an optical pulse propagating in a fiber into two polarization modes. Since these two modes have slightly different refractive indices, the two modes travel at different velocities, resulting in pulse spreading and deviation from the original polarization.

There are two primary components to Polarization mode dispersion, namely, differential group delay (DGD) and polarization-dependent chromatic dispersion (PCD).

The pulse spreading effect of dispersion causes signals in adjacent bit periods to overlap (referred to as inter-symbol interference). As such, one mode travels at a slightly faster speed than the other, such that the two modes begin to shift in time with respect to each other. On the receiver side, both modes are mixed together as the optical signal is converted to an electrical signal. The shift between polarization modes creates a smeared electrical signal and possibly multiple images of the signal. This phenomenon is referred to as differential group delay. The magnitude change of differential group delay with respect to wavelength results in polarization-dependent chromatic dispersion. The differential group delay generally dominates the polarization mode dispersion and is a more significant limiting factor compared to the polarization-dependent chromatic dispersion. As such, certain embodiments may only consider the differential group delay term in calculation of link specific signal impairments.

The polarization mode dispersion impairments, for differential group delay, may be aggregated as a root mean square of the components:

$$PMD_{Aggregate} = (PMD_1^2 + PMD_2^2 + PMD_3^2 + \ldots + PMD_K^2),$$

where $PMD_{Aggregate}$ is the aggregate polarization mode dispersion impairment value for the links in the network and $PMD_n^2$ $n=1, 2, 3, \ldots, K$ denotes the polarization mode dispersion for a given link.

The example embodiment 300 employs the integer conversion and scaling module 320 to square and scale the polarization mode dispersion values configured for links in the network to a 32-bit scaled integer. Upon conversion and scaling, the polarization mode dispersion values for the links are advertised by routing protocols (e.g., Open Shortest Path First) in terms of corresponding squared scaled 32-bit integer values.

Although by employing scaled values some loss of precision may be experienced, the scaled values can still include adequate precision to minimize any resulting inaccuracy.

Optical signal-to-noise ratio is a metric that represents an amount of noise in an optical signal. When a signal is amplified, both noise and information components of the signal are being amplified. Therefore, build-up of noise tends to occur as amplification is applied to a signal. As an amplification gain of a signal is increased, the noise level is increased, resulting in a reduction of the corresponding optical signal-to-noise ratio. Signal amplification is required to compensate for a variety of loss factors. Therefore, optical signal-to-noise ratio values for various spans are an aggregation of these various loss factors, an aggregation that is not necessarily linear.

Network spans may be designed to allow a margin for component aging and other inaccuracies. Therefore, the optical signal-to-noise ratio values need to be arranged to provide adequate safety margins that allow for aging and other non-linear inaccuracies.

Optical signal-to-noise ratio values are often stated in decibels (dB), with a 10 log factor that converts an absolute ratio value into decibels (dB). The integer conversation and scaling module 320 scales out the 10 log factor to obtain configured values of the optical signal-to-noise ratio values.

The optical signal-to-noise ratio aggregation is often done as an inverse of the sum of inverse optical signal-to-noise ratios. Specifically:

$$OSNR_{aggregate} = \frac{1}{\left(\frac{1}{OSNR_1} + \frac{1}{OSNR_2} + \frac{1}{OSNR_3} + \ldots + \frac{1}{OSNR_K}\right)}$$

wherein $OSNR_{Aggregate}$ is the aggregate optical signal-to-noise ratio impairment value for the links in the network and $$\frac{1}{OSNR_n}, n = 1, 2, 3, \ldots, K$$

denotes the optical signal-to-noise ratio for a given link.

The example embodiment 300 presents the optical signal-to-noise ratio impairments as inverse values that do not include the 10 log factor (i.e., $OSNR_n$). Therefore, an aggregate inverse optical signal-to-noise ratio impairment value for the links in the network may be obtained by simply adding the scaled inverse optical signal-to-noise ratio values.

The example embodiment 300 employs the integer conversion and scaling module 320 to inverse and scale the optical signal-to-noise ratio values configured for links in the network to arrive at corresponding 32-bit scaled integer values. Upon conversion and scaling, the optical signal-to-noise ratio values for the links are advertised by routing protocols (e.g., Open Shortest Path First) in terms of the inverse scaled 32-bit integer value. Specifically:

$$OSNR_{aggregate(inv)} = OSNR_{1(inv)} + OSNR_{2(inv)} + OSNR_{3(inv)} + \ldots + OSNR_{K(inv)},$$

which can be alternatively described as:

$$\frac{1}{OSNR_{aggregate}} = \frac{1}{OSNR_1} + \frac{1}{OSNR_2} + \frac{1}{OSNR_3} + \ldots + \frac{1}{OSNR_K}.$$

Although by employing scaled values some loss of precision may be experienced, the scaled values can still include adequate precision to minimize any resulting inaccuracy.

Limit testing (i.e., obtaining a limiting threshold) for optical signal-to-noise ratio may be challenging due to the following complicating factors:

The optical signal-to-noise ratio value that can be tolerated may be dependent on signal rate, signal encoding, forward error correction (FEC), and receiving module characteristics. Since specific signal rates can have an impact on optical signal-to-noise ratio value limit calculations, example embodiments of the present invention may determine when a constrained shortest path first (CSPF) method is being used to route a connection and allow the constraint shortest path first method to have an appropriate optical signal-to-noise ratio limit value during routing. The forward error correction utilized on a signal also has an impact on the optical signal-to-noise ratio limit value for a transponder. The possibilities with respect to forward error correction of a signal include:

No forward error correction,

International Telecommunication Union (ITU) G.709 forward error correction,

EFEC (Enhanced Forward Error Correction) Example embodiments of the invention accommodate for EFEC in optical transport layer control plane.

The optical signal-to-noise ratio nominal limit value may be determined from the signal bit rate. Specifically, a mapping of the optical channel (OCh) rate-specific signal types to the nominal optical signal-to-noise ratio performance requirement may be employed. The constrained shortest path first method may use a simple mapping lookup to determine the optical signal-to-noise ratio nominal limit value for its impairment limit check. An example mapping, including a margin to allow for error and for degradation over life, is illustrated in FIG. 3B. In this figure, the OCh Signal Type column identifies the signal being carried. The term OCh_10 refers to a standard 10 Gbps signal rate (transporting an ODU2 high order signal), and terms OCh_10a, OCh_10b and OCh_10c refer to rates transporting various overclocked ODU2 signals. The term OCh_40 refers to a standard 40 Giga bits per second (Gbps) signal (transporting and ODU3 high order signal). The OCh rate column in this table identifies the specific bit rate for the identified signal. The Nominal OSNR Spec column in this table identifies the minimum OSNR necessary to ensure successful signal reception at a receiver. This example assumes an EFEC signal encoding. In this example table, the example embodiment may use the identified nominal OSNR specification as a limit value for the identified signal rate when EFEC error correction is used. For example, the table may identify that a 40 Gbps OCh signal using EFEC requires a minimum of 16.5 dB of OSNR at the receiver to ensure successful signal reception, including a 3 decibels (dB) allowance for error and degradation over life.

A polarization mode dispersion penalty should be deducted from the accumulated OSNR prior to testing the aggregate value against a limiting value. The penalty value may be obtained using mathematical calculations that depend upon the optical channel signal rate. Since the polarization mode dispersion is mainly dominated by the DGD factor, the DGD factor is mainly used in the penalty calculations. The penalty value may be determined as:

$$PMD_{Penalty} = a.PMD^3 + b.PMD^2 + c.PMD + d$$

where a, b, c, and d are predetermined constants (some of which may be zero in some cases).

Additionally, when operating with both 10 GHz and 40 GHz channels, certain example embodiments may compensate for nonlinear interference effects of these channels (such as cross phase modulation (XPM) and self phase modulation (SPM)). These effects are based on the number of amplified hops in a path and are also channel spacing dependent. The SPM/XPM penalty can be determined as follows:

$$SPM/XPM_{Penalty} = a.N^3 + b.N^2 + c.N + d$$

where a, b, c, and d are predetermined constants (some of which may be zero in some cases).

If the links along a path are 88 channel links (i.e., signals having 50 GHz channel spacing), certain embodiments may employ the 88 channel calculations for determining polarization mode dispersion penalties as well as for determining the optical signal-to-noise ratio limit value. The example embodiments track the calculations of the constraint shortest path first method and determine whether or not a transition to an 88 channel link has occurred.

Reconfigurable optical add-drop multiplexer (ROADM) cascading penalties may result from bandwidth narrowing effects when cascading through multiple ROADMs. This is specially significant for 40 G (and higher) signals and for 88 channel systems. For differential quadrature phase shift keying (DQPSK) 40 GHz signals, some example embodiments may modify the OSNR limit value to allow for addition of a fixed penalty (e.g., 0.5 dB) for the first link (rather than cascading).

The mechanism for determining the polarization mode dispersion penalty value is signal rate dependent.

The mechanism for determining the polarization mode dispersion penalty value involves complex calculations that may create a performance issue in the optical transport network (OTN) constrained shortest path first (CSPF) route calculations.

In order to determine a composite optical signal-to-noise ratio test limit, certain embodiments combine various information (including those described above) into an optical signal-to-noise ratio limit test. Since the composite optical signal-to-noise ratio test is performed many times during optical transport network constrained shortest path first route calculations, example embodiments simplify the required mathematical operations.

Scaled entries for various optical channel signal rates may be classified into corresponding tables, with each table including entries for polarization mode dispersion value of each link and as well as a corresponding penalty value for each polarization mode dispersion value. The aggregated polarization mode dispersion value may be divided by a polarization mode dispersion scale resolution (a predetermined constant for each table), with both values being scaled in a 32 bit integer format. This is an integer division that truncates the values to the highest index while ensuring that a table entry PMD values does not exceed the target value. The polarization mode dispersion value entries of each table may be subtracted from the aggregated polarization mode dispersion value. The resulting value may be multiplied by a constant (e.g., 2). If the resulting value is larger than the polarization mode dispersion table resolution, some example embodiments add a constant (e.g., 1) to the index value. This reduces the error to a maximum of half of a table entry. The PMD penalty value can be determined using the resulting index value.

The OSNR limit check may be performed as:

$$(OSNR_{aggregated} - PMD_{Penalty}) > OSNR_{required}$$

where $OSNR_{aggregated}$ denotes the aggregated optical signal-to-noise ratio (in dB), $PMD_{Penalty}$ denotes the polarization mode dispersion penalty, and $OSNR_{required}$ denotes the optical signal-to-noise ratio required by the network (in dB).

Since the aggregated optical signal-to-noise ratio, $OSNR_{aggregated}$, is an inverse of the optical signal-to-noise ratio in a linear form (i.e., 10 log has been factored out), in order to simplify the required calculations, the polarization mode dispersion and polarization mode dispersion penalty tables may be modified to contain the polarization mode dispersion penalty values in the scaled form. Accordingly, the OSNR limit check may be performed as:

$$\frac{OSNR_{aggregated(inv)}}{PMD_{Penalty(inv)}} < OSNR_{required}$$

where $OSNR_{aggretated(inv)}$ denotes the inverse aggregated optical signal-to-noise ratio (in dB), $PMD_{Penalty(inv)}$ denotes the inverse polarization mode dispersion penalty, and $OSNR_{required(inv)}$ denotes the inverse optical signal-to-noise ratio required by the network (in dB).

However, the above division removes the scaling factor, resulting in a small fractional value, since the result is an unsealed inverse OSNR. But the divisor and dividend may be reversed to arrive at a non-inverse (and, therefore, non-fractional) integer value for the OSNR. Therefore:

$$\frac{PMD_{Penalty(inv)}}{OSNR_{aggregate(inv)}} > OSNR_{required}$$

Certain embodiments may predefine a set of tables of optical signal-to-noise ratio limit values for various rate (such as 40 GHz) signals such that each table contains values for the number of hops in the network for a given channel spacing. The SPM/XPM penalty may be pre-calculated into such tables.

Figure 4:
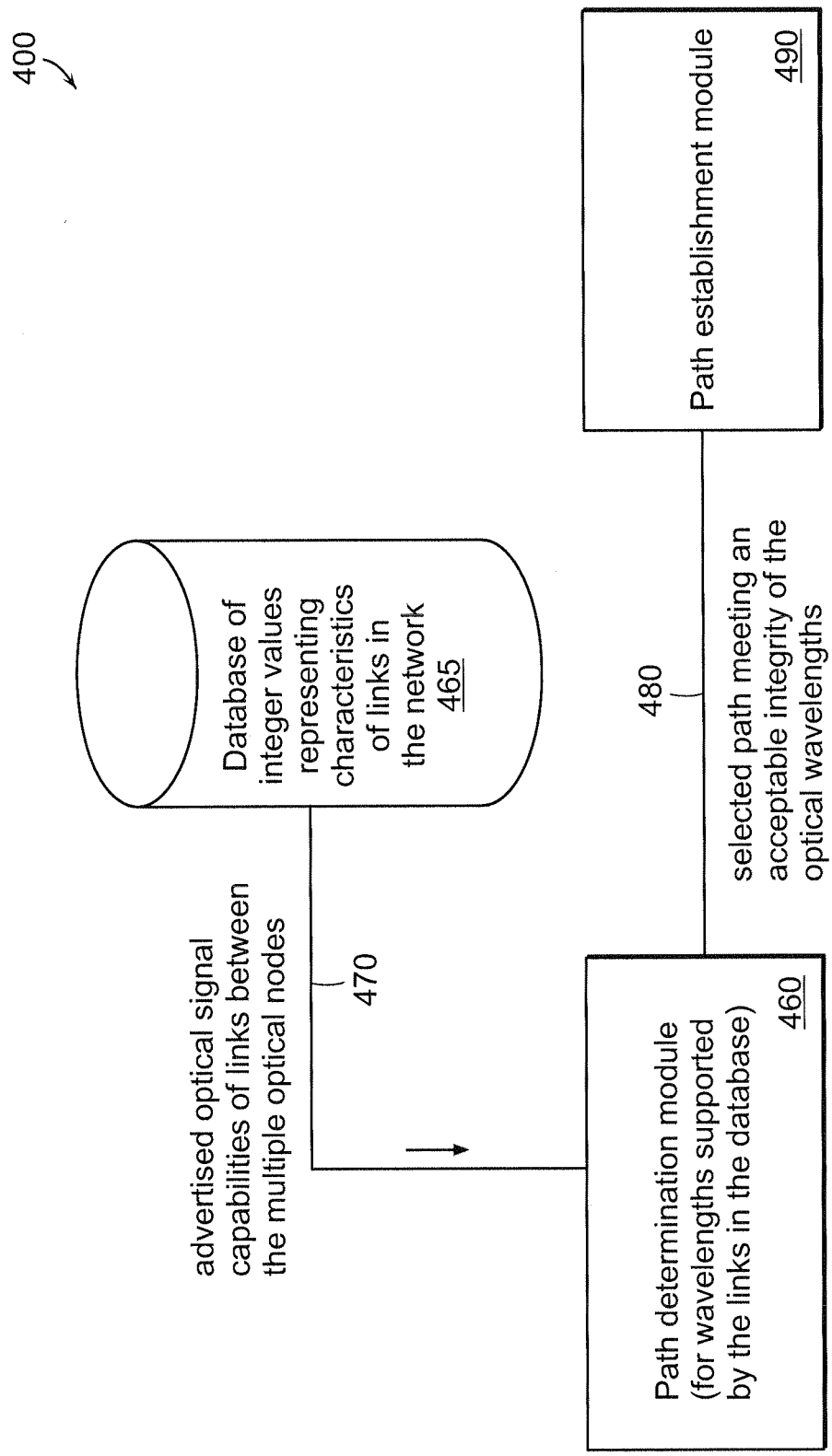
FIG. 4 is a flow diagram of an example embodiment of the present invention for determining a path meeting acceptable integrity of the optical wavelengths.

FIG. 4 is a flow diagram of an example embodiment 400 of the present invention for determining a path 480 meeting acceptable integrity of the optical wavelengths. The example embodiment 400 maintains a traffic engineering database 465 of values representing characteristics of links in the network, through storage of integer values of advertised optical signal capabilities of links between the multiple optical nodes. Using the advertised optical signal capabilities of links between the multiple optical nodes 470, the example embodiment 400 employs a path determination module 460 that determines a path through the network for optical wavelengths to be supported by the links represented in the database as a function of evaluating optical signal characteristics at each link along a possible path. The example embodiment 400 provides a selected path meeting an acceptable integrity of the optical wavelengths 480 to a path establishment module 490 that establishes the path through the optical network.

Figure 5:
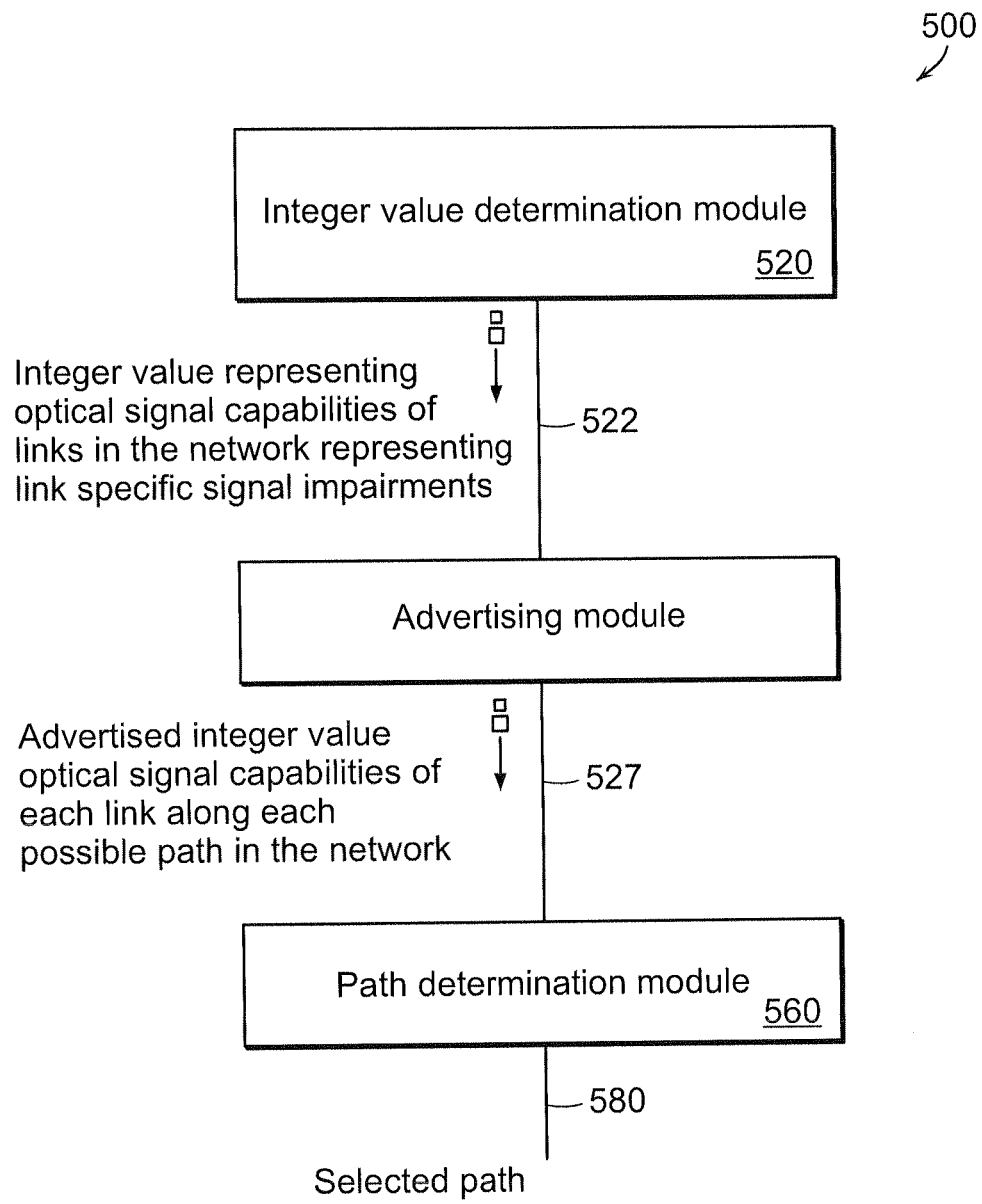
FIG. 5 is a schematic diagram that illustrates an example embodiment of the present invention for selecting a path.

FIG. 5 is a schematic diagram that illustrates an example embodiment 500 of the present invention for selecting a path 580. The example embodiment 500 determines integer values 522 representing optical signal capabilities of links in the network. The integer values 522 represent link specific signal impairments. The example embodiment 500 employs an advertising module 525 to advertise the integer value 522 optical signal capabilities of each link along each possible path in the network. A path determination module 560 determines a path 580 through the network for optical wavelengths to be supported by the links as a function of advertised integer value optical signal capabilities 527.

Figure 6:
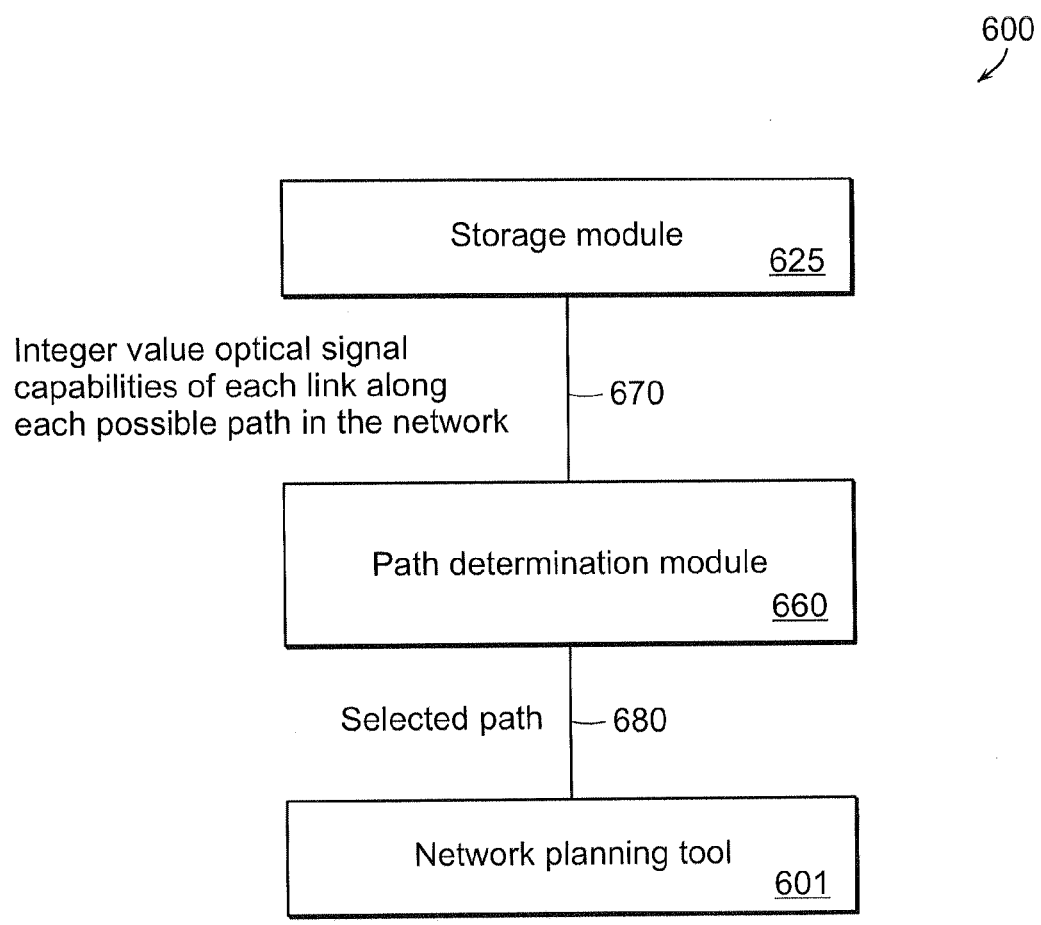
FIG. 6 is a high level block diagram of an example embodiment of the present invention.

FIG. 6 is a high level block diagram of an example embodiment 600 of the present invention. The example embodiment 600 maintains, in a database, integer value optical signal capabilities 670 of each link along each possible path in an optical network. The integer values 670 represent link specific signal impairments. A path determination module 660 determines a path through the network for optical wavelengths to be supported by the optical network links as a function of the maintained integer value 670 optical signal capabilities. The determined path 680 meets an acceptable integrity of the optical wavelengths. The determined path 680 is provided to a network planning tool 601. The network planning tool 601 may record the determined network paths 680 for future use in planning a network. In certain embodiments, the output from a planning tool might be used to fine-tune or modify the network design for future use in the planning tool or for enhancing a current network configuration. The network planning tool 601 may further provide a recorded path to a path establishment module (not shown) to establish the path through the network.

In certain embodiments, the example embodiment 600 may advertise the integer value optical signal capabilities (i.e., the integer values are advertised by network entities and are no longer maintained in an external database). In such embodiments, the path determination module 660 determines a path through the network for optical wavelengths to be supported by the optical network links as a function of the advertised integer value optical signal capabilities.

It should be understood that procedures, such as those illustrated by flow diagram or block diagram herein or otherwise described herein, may be implemented in the form of hardware, firmware, or software. If implemented in software, the software may be implemented in any software language consistent with the teachings herein and may be stored on any computer readable medium known or later developed in the art. The software, typically, in form of instructions, can be coded and executed by a processor in a manner understood in the art.

While this invention has been particularly shown and described with references to example embodiments thereof, it will be understood by those skilled in the art that various changes in form and details may be made therein without departing from the scope of the invention encompassed by the appended claims.

What is claimed is:

1. A method for routing of optical wavelengths in an optical network having multiple optical network nodes, the method comprising:
    maintaining a traffic engineering database of values representing characteristics of links in the network, through storage of integer values representing advertised optical signal capabilities of links between the multiple optical nodes, the traffic engineering database including scaled integer values representing squared values of polarization mode dispersion impairments of the links between the multiple optical nodes;

determining a path through the network for optical wavelengths to be supported by the links represented in the database as a function of evaluating optical signal characteristics at each link along a possible path using the advertised optical signal capabilities; and providing a selected path meeting an acceptable integrity of the optical wavelengths to a path establishment module to establish the path through the optical network.

2. The method of claim 1 wherein the optical signal capabilities include link specific signal impairments.

3. The method of claim 2 wherein the link specific signal impairments include at least one of optical signal-to-noise ratio, chromatic dispersion, or polarization mode dispersion impairments.

4. The method of claim 1 wherein the traffic engineering database includes scaled integer values representing chromatic dispersion impairments of the links between the multiple optical nodes.

5. The method of claim 4 wherein the scaled integer values are obtained using an agent or a control plane code.

6. The method of claim 1 wherein the traffic engineering database includes scaled integer values representing inverse values of optical signal-to-noise ratio impairments of the links between the multiple optical nodes.

7. The method of claim 1 further including determining the acceptable integrity of the optical wavelengths for a selected path as a function of aggregating the advertised optical signal capabilities.

8. A method for routing of optical wavelengths in an optical network having multiple optical network nodes, the method comprising:

maintaining a traffic engineering database of values representing characteristics of links in the network, through storage of integer values representing advertised optical signal capabilities of links between the multiple optical nodes, the traffic engineering database including scaled integer values representing inverse values of optical signal-to-noise ratio impairments of the links between the multiple optical nodes;

determining a path through the network for optical wavelengths to be supported by the links represented in the database as a function of evaluating optical signal characteristics at each link along a possible path using the advertised optical signal capabilities;

providing a selected path meeting an acceptable integrity of the optical wavelengths to a path establishment module to establish the path through the optical network; and obtaining an aggregate value of the scaled integer values representing the inverse values of optical signal-to-noise ratio impairments, deducting one or more offset penalty values from the aggregate value, comparing resulting value against a threshold value, and in an event the resulting value exceeds the threshold value, determining an unacceptable integrity of the optical wavelengths for a candidate path as a function of the resulting value.

9. The method of claim 8 wherein the offset penalty value is a polarization mode dispersion penalty value.

10. The method of claim 9 wherein the polarization mode dispersion penalty value is optical signal rate dependent.

11. The method of claim 8 further including determining the threshold value as a function of optical signal bit rate.

12. A method for planning deployment of optical network links, the method comprising:

maintaining a database of integer values representing the optical signal capabilities of each link along each possible path in an optical network, the integer values including scaled integer values representing squared values of polarization mode dispersion impairments;

determining a path through the network for optical wavelengths to be supported by the optical network links as a function of advertised integer values representing optical signal capabilities of the links, the determined path meeting an acceptable integrity of the optical wavelengths; and providing the determined path to a network planning tool to employ the path for planning the optical network.

13. An apparatus for routing of optical wavelengths in an optical network having multiple optical network nodes, the apparatus comprising:

a traffic engineering storage module to maintain a traffic engineering database of values, representing characteristics of links in the network, through storage of integer values representing advertised optical signal capabilities of links between the multiple optical nodes, the traffic engineering database including scaled integer values representing squared values of polarization mode dispersion impairments of the links between the multiple optical nodes;

a path determination module to determine a path through the network for optical wavelengths to be supported by the links represented in the database as a function of evaluating optical signal characteristics at each link along a possible path using the advertised optical signal capabilities; and a path selection module to provide a selected path meeting an acceptable integrity of the optical wavelengths to a path establishment module to establish the path through the optical network.

14. The apparatus of claim 13 wherein the optical signal capabilities include link specific signal impairments.

15. The apparatus of claim 14 wherein the link specific signal impairments include at least one of optical signal-to-noise ratio, chromatic dispersion, or polarization mode dispersion impairments.

16. The apparatus of claim 13 wherein the traffic engineering database includes scaled integer values representing chromatic dispersion impairments of the links between the multiple optical nodes.

17. The apparatus of claim 16 wherein the scaled integer values are obtained using an agent or a control plane code.

18. The apparatus of claim 13 wherein the traffic engineering database includes scaled integer values representing inverse values of optical signal-to-noise ratio impairments of the links between the multiple optical nodes.

19. The apparatus of claim 13 wherein the path selection module is arranged to determine the acceptable integrity of the optical wavelengths for a selected path as a function of aggregating the advertised optical signal capabilities.

20. An apparatus for routing of optical wavelengths in an optical network having multiple optical network nodes, the apparatus comprising:

a traffic engineering storage module to maintain a traffic engineering database of values, representing characteristics of links in the network, through storage of integer values representing advertised optical signal capabilities of links between the multiple optical nodes, the traffic engineering database including scaled integer values representing inverse values of optical signal-to-noise ratio impairments of the links between the multiple optical nodes;

a path determination module to determine a path through the network for optical wavelengths to be supported by the links represented in the database as a function of evaluating optical signal characteristics at each link along a possible path using the advertised optical signal capabilities;

a path selection module to provide a selected path meeting an acceptable integrity of the optical wavelengths to a path establishment module to establish the path through the optical network; and an acceptable integrity determination module to obtain an aggregate value of the scaled integer values representing the inverse values of optical signal-to-noise ratio impairments, deduct one or more offset penalty values from the aggregate value, compare resulting value against a threshold value, and, in an event the resulting value exceeds the threshold value, determine an unacceptable integrity of the optical wavelengths for a candidate path as a function of the resulting value.

21. The apparatus of claim 20 wherein the offset penalty value is a polarization mode dispersion penalty value.

22. The apparatus of claim 21 wherein the polarization mode dispersion penalty value is optical signal rate dependent.

23. The apparatus of claim 20 further wherein the acceptable integrity determination module is arranged to determine the threshold value as a function of optical signal bit rate.

24. An apparatus for planning deployment of optical network links, the apparatus comprising:

an integer value storage module to maintain integer values representing optical signal capabilities of each link along each possible path in an optical network, the integer values including scaled integer values representing squared values of polarization mode dispersion impairments of the links between multiple optical nodes;

a path determination module to determine a path through the network for optical wavelengths to be supported by the optical network links as a function of advertised integer values representing the optical signal capabilities, the path determined meeting an acceptable integrity of the optical wavelengths; and a reporting module to provide the path determined to a network planning tool to employ the path for planning the optical network.

25. A method for routing of optical wavelengths in an optical network having multiple optical network nodes, the method comprising:

determining integer values representing optical signal capabilities of links in the network, the integer values including scaled integer values representing squared values of polarization mode dispersion impairments of links between the multiple optical nodes;

advertising the integer values representing the optical signal capabilities of each link along each possible path in the network; and determining a path through the network for optical wavelengths to be supported by the links as a function of advertised integer values representing the optical signal capabilities.

26. The method of claim 25 wherein the optical signal capabilities include link specific signal impairments, the link specific impairments including at least one of optical signal-to-noise ratio, chromatic dispersion, or polarization mode dispersion impairments.

27. The method of claim 25 further including determining an acceptable integrity of the optical wavelengths for each path as a function of aggregating the advertised integer values representing the optical signal capabilities.

28. An apparatus for routing of optical wavelengths in an optical network having multiple optical network nodes, the apparatus comprising:

an integer determination module to determine integer values representing optical signal capabilities of links in the network, the integer values including scaled integer values representing squared values of polarization mode dispersion impairments of the links between nodes in the network;

an advertising module to advertise the integer values representing the optical signal capabilities of each link along each possible path in the network; and a path determination module to determine a path through the network for optical wavelengths to be supported by the links as a function of advertised integer values representing the optical signal capabilities.

29. The apparatus of claim 28 wherein the optical signal capabilities include link specific signal impairments, the link specific impairments including at least one of optical signal-to-noise ratio, chromatic dispersion, or polarization mode dispersion impairments.

30. The apparatus of claim 28 further including an acceptable integrity determination module to determine the acceptable integrity of the optical wavelengths for each path as a function of aggregating the advertised integer values representing the optical signal capabilities.

* * * * *